United States Patent
Kumar et al.

[11] Patent Number: 5,352,544
[45] Date of Patent: Oct. 4, 1994

[54] FAST ION CONDUCTORS

[75] Inventors: Binod Kumar, Centerville; Richard A. Marsh, Tipp City, both of Ohio

[73] Assignee: The United States of America as represented by the Secretary of the Air Force, Washington, D.C.

[21] Appl. No.: 69,322

[22] Filed: Jun. 1, 1993

[51] Int. Cl.$^5$ ............................................. H01M 14/00
[52] U.S. Cl. ............................................. 429/4; 429/192
[58] Field of Search ............................... 429/4, 7, 192

[56] References Cited

U.S. PATENT DOCUMENTS

| | | | |
|---|---|---|---|
| 3,654,426 | 4/1972 | Brinkmann et al. | 429/7 |
| 4,025,698 | 5/1977 | von Krusenstierna | 429/4 |
| 4,826,743 | 5/1989 | Nazri | 429/191 |
| 4,886,716 | 12/1989 | Roggero et al. | 429/192 |
| 4,888,257 | 12/1989 | Narang | 429/192 |
| 5,061,581 | 10/1991 | Narand et al. | 429/192 |
| 5,162,175 | 11/1992 | Visco et al. | 429/192 |

*Primary Examiner*—Stephen Kalafut
*Attorney, Agent, or Firm*—Charles E. Bricker; Thomas L. Kundert

[57] ABSTRACT

In units comprising solid polymer electrolytes, the ionic conductivity of such electrolytes is increased by mechanically exciting the units. Such units can be solid state batteries or electrochromic devices or the like. Mechanical excitation may be provided by, for example, a piezoelectric transducer.

10 Claims, 2 Drawing Sheets

KEY
A - PEO/LiClO$_4$   12:1
B - Crosslinked PEO/LiClO$_4$   8:1
C - PPO/LiCF$_3$SO$_3$   4:1
D - PEA/LiCF$_3$SO$_3$   4:1
E - PES/LiBF$_4$   6:1
F - PPHz/LiCF$_3$SO$_3$   4:1
G - PmAZ/LiClO$_4$   8:1

5,352,544

FAST ION CONDUCTORS

RIGHTS OF THE GOVERNMENT

The invention described herein may be manufactured and used by or for the Government of the United States for all governmental purposes without the, payment of any royalty.

BACKGROUND OF THE INVENTION

This invention relates to solid polymer electrolytes useful in rechargeable batteries, power supplies, capacitors and microelectrochemical sensors.

Lithium has long been regarded as a desirable component of galvanic cells. It is inexpensive and its high reduction potential ($E°_{red} = -3.024$ v) and light weight have often suggested its use as the anodic component in high energy-density storage batteries. The reactivity of Li with water has required the use of non-aqueous electrolytes such as organic soluble lithium perchlorates, or fused lithium halides. $Li^+$ conductors which are solid and are more highly conductive at lower temperatures than previously used electrolytes would be quite useful in such utilities; these conductors also serve to separate the anodic and cathodic components.

Solid electrolytes and in particular completely solid state galvanic cells offer special advantages as high-energy density, high-power density primary batteries. These advantages include the possibility for long shelf life, broad temperature limits of operability and miniaturization. A $Li^+$ conducting solid electrolyte would provide the basis for a lighter and lower cost alternative to the solid state batteries which rely in the transport of $Ag^+$ in various silver halides.

Solid electrolytes for use in batteries and other electrochemical devices must have good ionic conductivity in addition to excellent film forming properties and good storage stability. Moreover, the solid electrolyte must be simple to produce.

It is known that inorganic solid electrolytes such as $Na-\beta-Al_2O_3$ and $Na_{1+x}Zr_2P_{3-x}Si_xO_{13}$ (where x is 0 to 3) have good ionic conductivity. However, these inorganic solid electrolytes have very low mechanical strength and are difficult to process into a flexible film.

Further, it is known that complexes of certain polymeric materials and various salts of metals belonging to Group I or Group II of the Periodic Table (e.g., $LiCF_3SO_3$, LiI, LiB, $LiClO_4$, NaI, $NaCF_3SO_3$ and $KCF_3SO_3$) function as solid electrolytes. These polymers include polyethylene oxide (PEO), polypropylene oxide (PPO), poly(ethylene adipate) (PEA), poly(ethylene succinate) (PES), polyphosphazine (PPhz), polysiloxane, poly(N-methylaziridine) (PmAZ), triol type PEO crosslinked with dysfunctional urethane, PEO-PPO-PEO block copolymer crosslinked with trifunctional urethane, and the like. These complexes have good pliability and viscoelasticity, both of which are inherent to polymeric materials, and are easy to process.

High energy density, rechargeable solid polymer electrolyte-using solid state batteries promise virtually maintenance-free reliable operation over many thousands of cycles. However, the ionic conductivity of the above polymers is highly temperature dependent. Although the ionic conductivity is good at temperatures above room temperature, the ionic conductivity abruptly decreases at room temperature or lower. Thus it is difficult to use these polymers in general purpose commercial products for use over a wide temperature range.

Accordingly, it is an object of the present invention to provide a method for increasing the ionic conductivity of solid polymer electrolytes, particularly at and below room temperature.

It is another object of the present invention to provide a solid state battery system exhibiting reliable operation at and below room temperature.

Other objects and advantages of the invention will be apparent to those skilled in the art.

SUMMARY OF THE INVENTION

In accordance with the present invention there is provided a method for increasing the ionic conductivity of solid polymer electrolytes which comprises mechanically exciting the units which comprise the polymer electrolytes.

There is also provided a solid state battery system which comprises a solid state battery having a solid polymer electrolyte and means for mechanically exciting the polymer electrolyte.

DETAILED DESCRIPTION OF THE INVENTION

Figure 1:
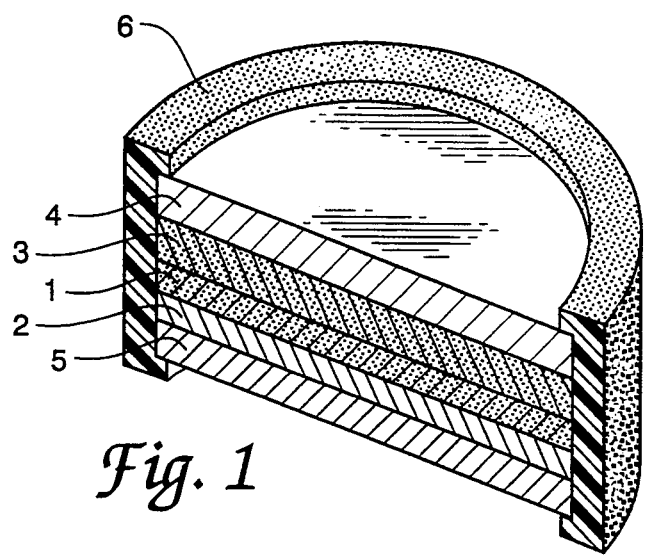
FIG. 1 is a sectioned perspective view of a solid-state battery.

FIG. 1 illustrates a typical lithium cell wherein a solid polymer electrolyte 1 is sandwiched between a lithium electrode 2 and a counter-electrode 3 (e.g., $MnO_2$) which in turn is sandwiched between two metal electrical contacts 4 and 5, held in a plastic housing 6.

Figure 2:
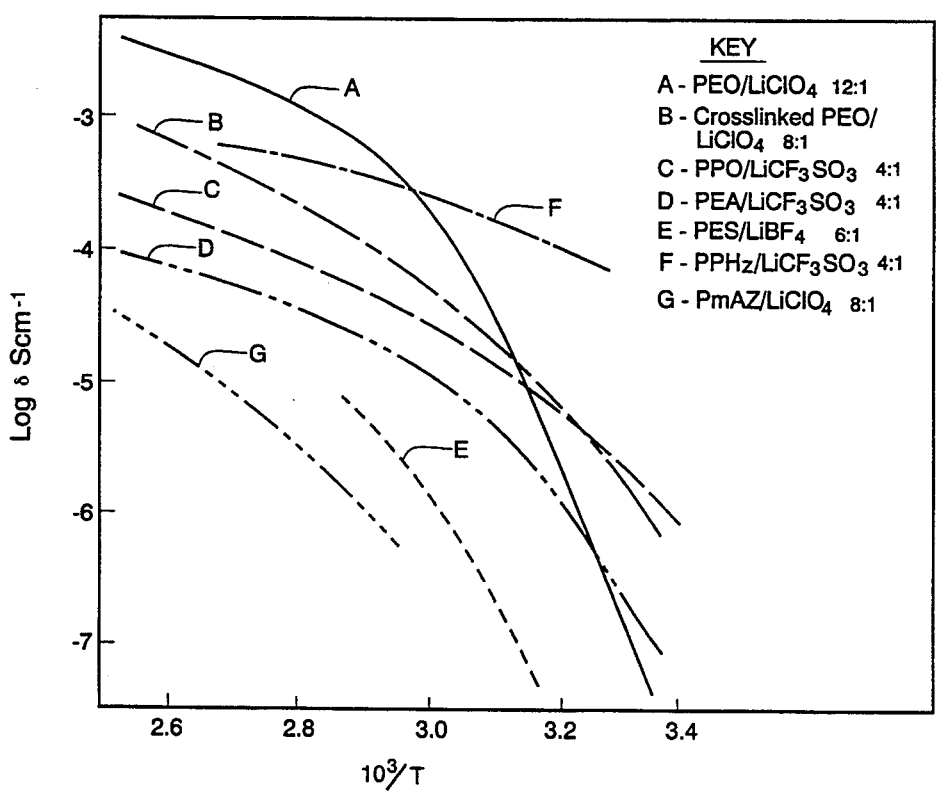
FIG. 2 is a graph of resistivity vs temperature for a variety of conductive polymers.

Polymers having reasonably high conductivity, i.e., at least about $10^{-3}$ Siemens (S) $cm^{-1}$, at temperatures about 50°-100° C. are generally considered acceptable for use in solid state batteries. The conductivity of such polymers exhibit strong temperature dependence as shown in FIG. 2. As seen in FIG. 2, $LiClO_4$-doped PEO is the only electrolyte, among those shown, to achieve this desired conductivity, and then only at temperatures of about 80° C. and above.

Figure 3:
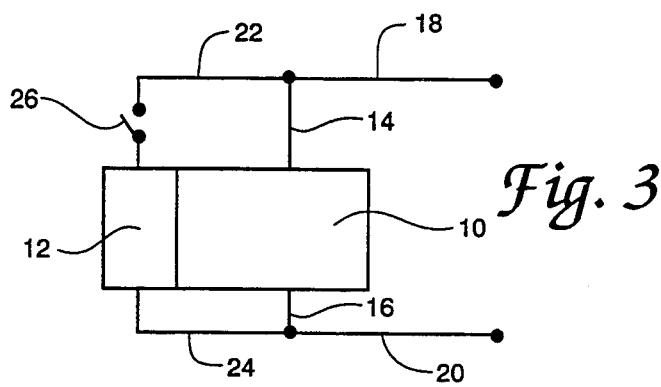
FIG. 3 is a schematic diagram of a solid-state battery in accordance with the invention.

The conductivity of solid polymer electrolytes is increased by mechanical excitation. Such excitation may be accomplished by incorporating with or securely attaching a suitable transducing device to the device under consideration. FIG. 3 illustrates a self-primed battery in accordance with the invention which comprises a solid polymer electrolyte-containing solid state battery 10 having a transducer means 12 attached thereto. Battery 10 has contact means 14 and 16 for attachment to primary power leads 18 and 20, which in turn connect to an external load, not shown. Also connected to contact means 14 and 16 are secondary power leads 22 and 24 which provide electrical power to transducer means 12. Power lead 22 includes switching means 26 so that the transducer means can be turned on and off, as necessary. The transducer means 12 comprises appropriate circuitry, not shown, for driving the transducer. Piezoelectric transducers are well suited for this application, although other electro-mechanical transducers may also be used.

Figure 4:
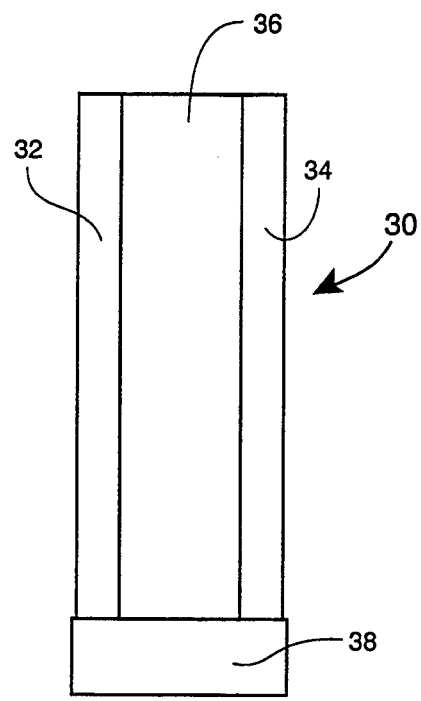
FIG. 4 is a sectioned view of an electrochromic device in accordance with the invention.

The response of electrochromic devices based on $WO_3$ and having a polymer electrolyte can be enhanced by mechanical excitation. FIG. 4 illustrates such a device 30, comprising a lithium-coated first electrode 32, a $WO_3$-coated second electrode 34 and a polymer electrolyte 36 disposed therebetween. At least one transducer means 38 is attached to device 30 in such manner that excitation produced by transducer means 38 is mechanically coupled to electrolyte 36.

The following example illustrates the invention:

EXAMPLE

The batteries employed in this example had a rated capacity of 20 mAh with a nominal voltage of 6 v. These batteries are available commercially from Gould Electronics, East Lake, Ohio 44095, under the tradename Thinergy.

The batteries were taped to the bottom of an ultrasonic cleaner for mechanical excitation over a frequency range of 40–400 KHz. The discharge rates were determined under loads of 1 K-ohm and 22 K-ohm at a temperature of about 31°C., with and without mechanical excitation.

Figure 5:
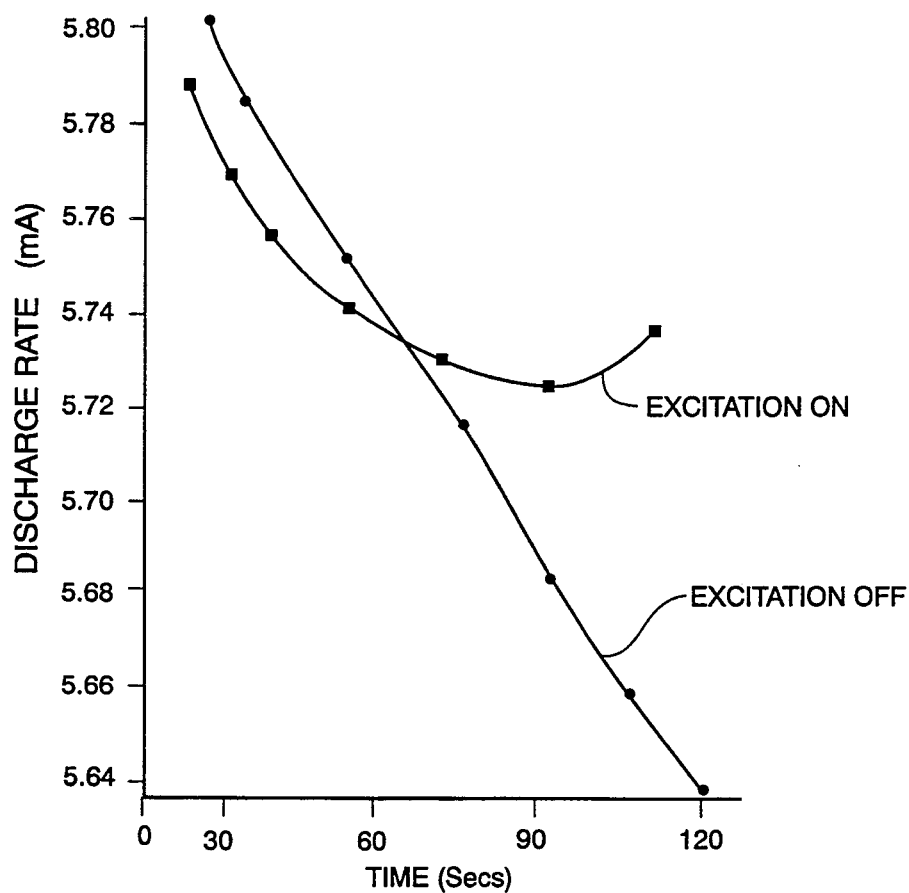
FIG. 5 is a graph of discharge rate vs time for a 6 v solid-state battery with a circuit load of 1 K-ohm, with and without excitation.

Referring to FIG. 5, it can be seen that under a circuit load of 1 K-ohm and without mechanical excitation, the discharge rate of the battery decreases almost linearly over the period 30–120 sec. In contrast, when mechanically excited, at about 40–400 KHz, the discharge rate initially decreases, but begins to increase after about 90 sec.

Figure 6:
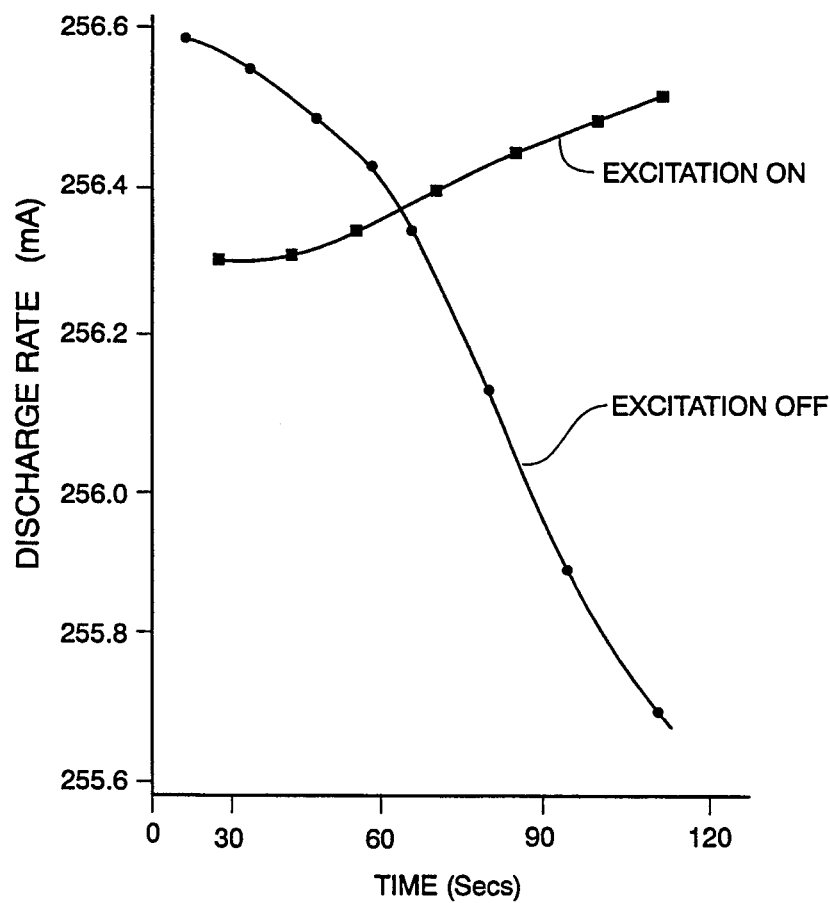
FIG. 6 is a graph of discharge rate vs time for a 6 v solid-state battery with a circuit load of 22 K-ohm, with and without excitation.

Referring to FIG. 6, when tested with a 22 K-ohm load and without mechanical excitation, the battery exhibited a similar decrease in discharge rate over time. However, with mechanical excitation, the battery exhibits an increase in discharge rate.

Various modifications may be made to the invention as described without departing from the spirit of the invention or the scope of the appended claims.

We claim:

1. A method for increasing the ionic conductivity of the solid polymer electrolyte in a unit consisting essentially of an electrode, a counter-electrode, a solid polymer electrolyte between said electrode and said counter-electrode, a first electrical contact in conducting relation with said electrode, a second electrical contact in conducting relation with said counter-electrode, and a housing holding said electrical contacts, said electrode, said counter-electrode and said polymer electrolyte, which comprises mechanically exciting said unit.

2. The method of claim 1 wherein said mechanical excitation is provided by piezoelectric means.

3. The method of claim 1 wherein said excitation is provided in the frequency range of 40 to 400 KHz.

4. The method of claim 1 wherein said unit is a solid state battery.

5. The method of claim 4 wherein said battery is a lithium cell.

6. The method of claim 1 wherein said unit is an electrochromic device.

7. A solid state battery system which comprises a solid state battery having a solid polymer electrolyte and means for mechanically exciting the polymer electrode, wherein said excitation means is in physical contact with said battery.

8. The battery system of claim 7 wherein said solid state battery is a lithium cell.

9. The battery system of claim 8 wherein said polymer electrolyte is polyethylene oxide doped with LiClO$_4$.

10. The battery system of claim 7 wherein said means for mechanically exciting said polymer electrolyte is a piezoelectric transducer.

* * * * *